(12) United States Patent
Hudson et al.

(10) Patent No.: US 11,771,293 B2
(45) Date of Patent: Oct. 3, 2023

(54) SCRAPER APPARATUS

(71) Applicant: CENTRAL GARDEN & PET COMPANY, Walnut Creek, CA (US)

(72) Inventors: Andrew Hudson, Mukwonago, WI (US); Gary Dunn, Greendale, WI (US)

(73) Assignee: CENTRAL GARDEN & PET COMPANY, Walnut Creek, CA (US)

( * ) Notice: Subject to any disclaimer, the term of this patent is extended or adjusted under 35 U.S.C. 154(b) by 0 days.

(21) Appl. No.: 17/450,358

(22) Filed: Oct. 8, 2021

(65) Prior Publication Data

US 2022/0111421 A1 Apr. 14, 2022

Related U.S. Application Data

(60) Provisional application No. 63/089,759, filed on Oct. 9, 2020.

(51) Int. Cl.
| | |
|---|---|
| *B08B 1/00* | (2006.01) |
| *B25G 3/10* | (2006.01) |
| *B25G 3/04* | (2006.01) |
| *B25G 3/26* | (2006.01) |
| *A47L 13/08* | (2006.01) |
| *A47L 13/022* | (2006.01) |

(52) U.S. Cl.
CPC ............ *A47L 13/08* (2013.01); *A47L 13/022* (2013.01); *B08B 1/005* (2013.01); *B25G 3/04* (2013.01); *B25G 3/10* (2013.01); *B25G 3/26* (2013.01)

(58) Field of Classification Search
None
See application file for complete search history.

(56) References Cited

U.S. PATENT DOCUMENTS

| | | | | |
|---|---|---|---|---|
| 4,617,736 | A * | 10/1986 | McCrary | B26B 5/006 30/169 |
| 9,849,599 | B2 * | 12/2017 | Gers-Barlag | B26B 21/52 |
| 10,814,508 | B1 * | 10/2020 | Gilman | B26B 21/4062 |
| 2016/0107324 | A1 * | 4/2016 | Robertson | B26B 21/523 30/53 |
| 2016/0193740 | A1 * | 7/2016 | Phillips | B26B 21/521 30/34.05 |
| 2019/0314864 | A1 * | 10/2019 | Cazier | B25G 3/02 |

* cited by examiner

*Primary Examiner* — Laura C Guidotti
*Assistant Examiner* — Dana Lee Poon
(74) *Attorney, Agent, or Firm* — Grossman, Tucker, Perreault & Pfleger, PLLC

(57) ABSTRACT

A scraper apparatus, comprising a scraper blade; a scraper blade holder; wherein the scraper blade and the scraper blade holder are rotatable relative to one another about a pivot connection formable by the scraper blade and the scraper blade holder; wherein the scraper blade has at least one scraper blade fastener; wherein the scraper blade holder has at least one scraper blade holder fastener; and wherein the at least one scraper blade fastener is fastenable with the at least one scraper blade holder fastener via the scraper blade and/or the scraper blade holder being rotated about the pivot connection.

20 Claims, 10 Drawing Sheets

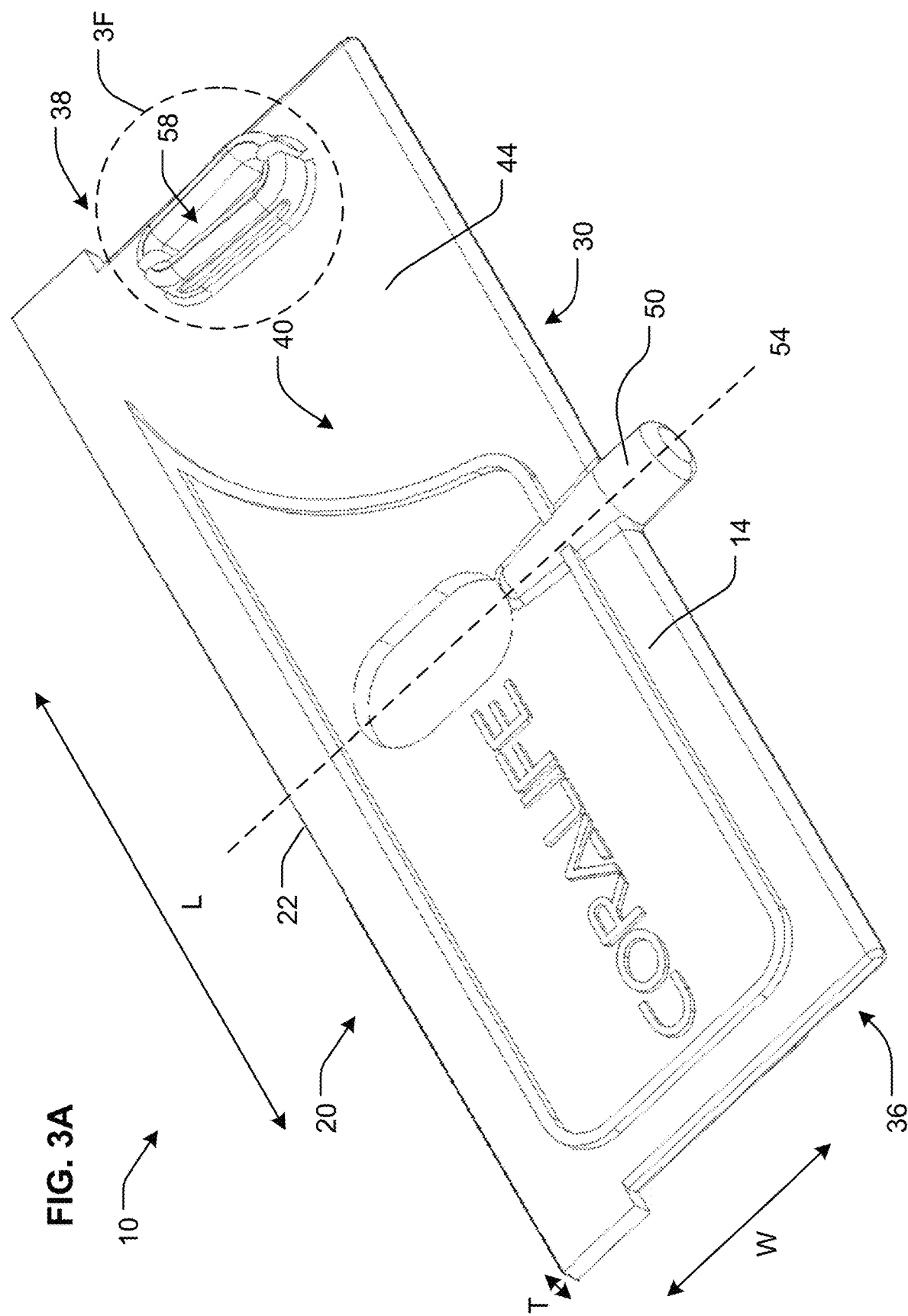

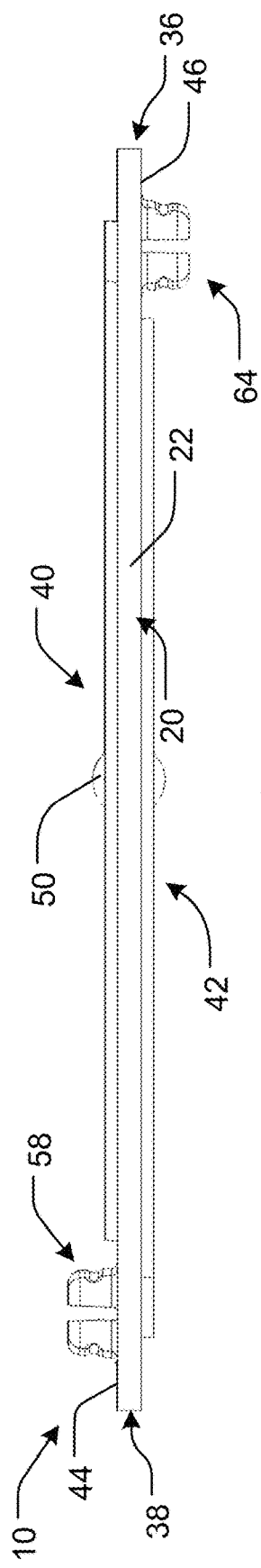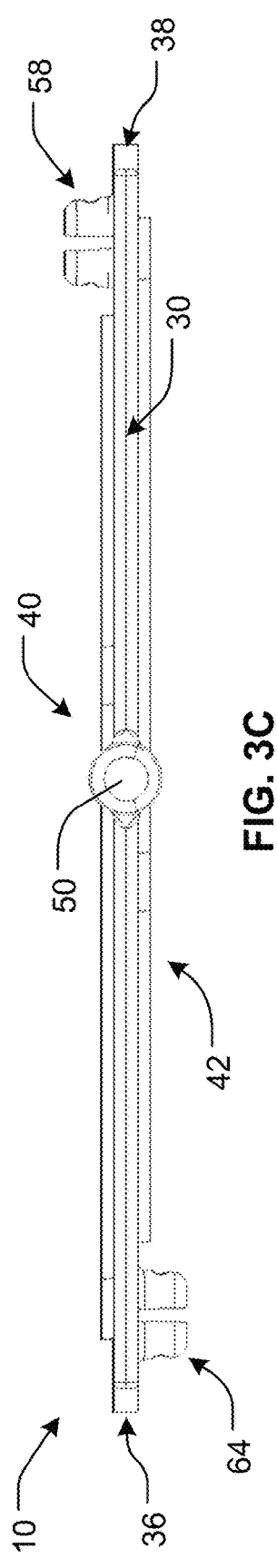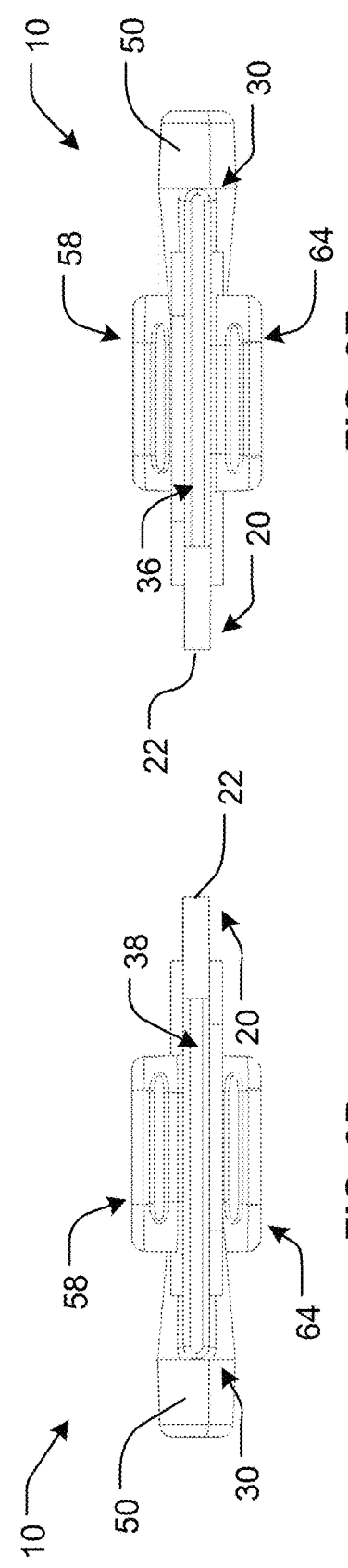

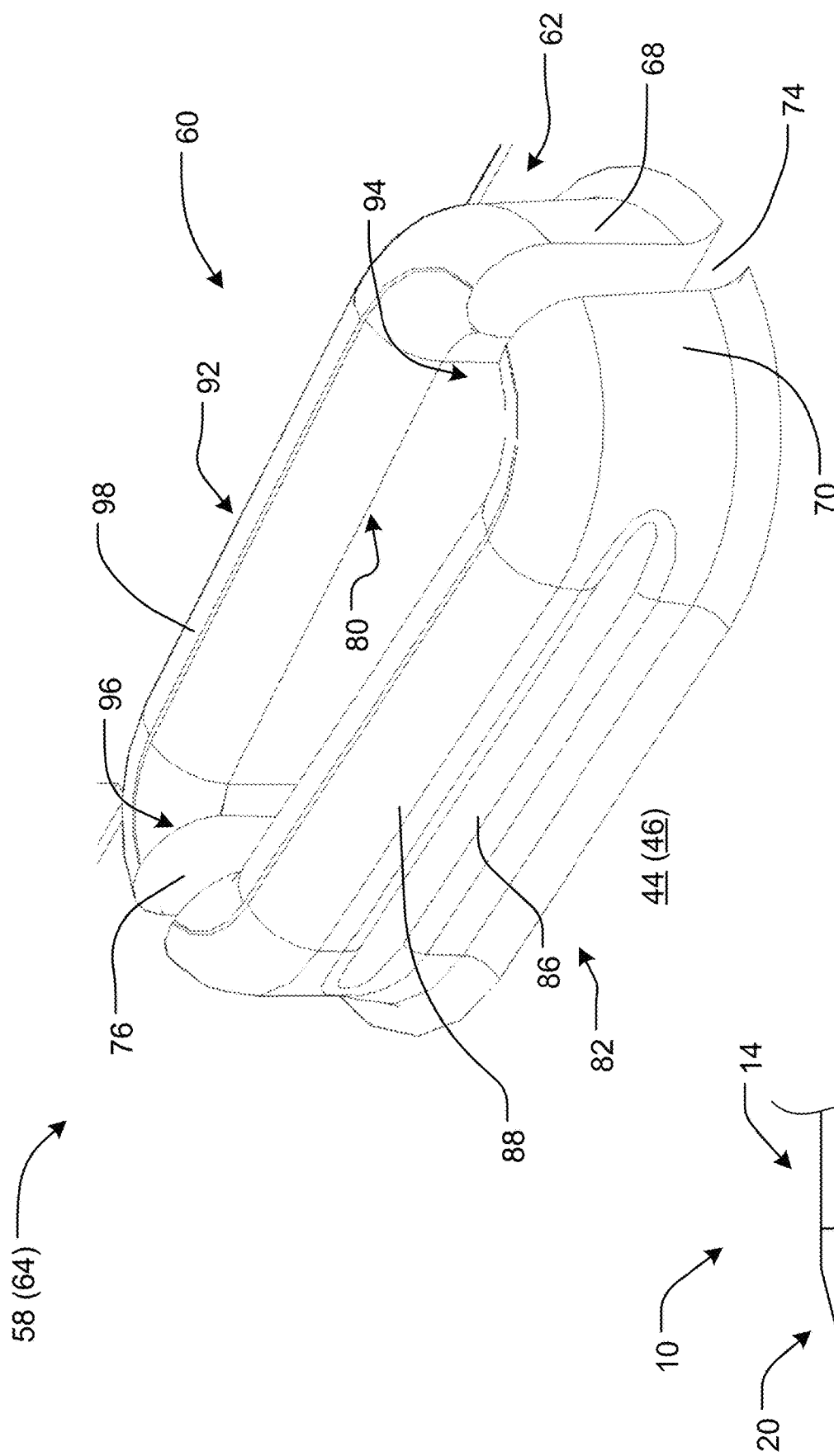

SCRAPER APPARATUS

FIELD

The present disclosure relates to a scraper apparatus, which may be particularly used, for example, to remove algae from an aquarium, particularly the transparent viewing walls of the tank, which may be formed of transparent plastic or glass.

SUMMARY

A scraper apparatus is provided, which, in at least one embodiment, comprises a scraper blade; a scraper blade holder; wherein the scraper blade and the scraper blade holder are rotatable relative to one another about a pivot connection formable by the scraper blade and the scraper blade holder; wherein the scraper blade has at least one scraper blade fastener; wherein the scraper blade holder has at least one scraper blade holder fastener; and wherein the at least one scraper blade fastener is fastenable with the at least one scraper blade holder fastener via the scraper blade and/or the scraper blade holder being rotated about the pivot connection.

In at least one embodiment, the scraper blade comprises a leading end and a trailing end; and the pivot connection extends along a pivot axis which is transverse to the leading end and/or the trailing end.

In at least one embodiment, the scraper blade or the scraper blade holder comprises a pivot pin; the scraper blade or the scraper blade holder comprises a pivot pin receptacle; and the pivot pin connection is formable by the pivot pin and the pivot pin receptacle.

In at least one embodiment, the scraper blade comprises the pivot pin; and the scraper blade holder comprises the pivot pin receptacle.

In at least one embodiment, the at least one scraper blade fastener comprises at least one scraper blade male fastener and/or a at least one scraper blade female fastener; the at least one scraper blade holder fastener comprises at least one scraper blade holder male fastener and/or at least one scraper blade holder female fastener; and the at least one scraper blade male fastener is fastenable with the at least one scraper blade holder female fastener and/or the at least one scraper blade holder male fastener is fastenable with the at least one scraper blade female fastener.

In at least one embodiment, the at least one scraper blade fastener comprises the at least one scraper blade male fastener; the at least one scraper blade holder fastener comprises the at least one scraper blade holder female fastener; and the at least one scraper blade male fastener is fastenable with the at least one scraper blade holder female fastener via the scraper blade and/or the scraper blade holder being rotated about the pivot connection.

In at least one embodiment, the at least one scraper blade male fastener comprises at least one projection shaped as an annular ring; and the at least one scraper blade holder female fastener surrounds the at least one projection and comprises at least one projection receptacle which receives the projection.

In at least one embodiment, the annular ring is a split annular ring.

In at least one embodiment, the at least one projection receptacle comprises at least engagement tab; the projection comprises at least one engagement tab recess; and the at least one engagement tab is fastenable with the at least one engagement tab recess.

In at least one embodiment, the at least engagement tab comprises an elongated, semi-circular engagement tab; and the at least one engagement tab recess comprises an elongated, semi-circular engagement tab recess.

In at least one embodiment, the at least one engagement tab comprises at least two engagement tabs; the at least one engagement tab recess comprises at least two engagement tab recesses; and each one of the at least two engagement tabs is fastenable with each one of the at least two engagement tab recesses, respectively.

In at least one embodiment, the at least one scraper blade fastener is fastenable with the at least one scraper blade holder fastener with positive mechanical engagement.

In at least one embodiment, the scraper blade has rotational symmetry when rotated about the pivot connection.

In at least one embodiment, the at least one scraper blade fastener comprises at least two scraper blade fasteners; the at least one scraper blade holder fastener comprises at least two scraper blade holder fasteners; and each one of the at least two scraper blade fasteners is fastenable with each one of the at least two scraper blade holder fasteners, respectively, via the scraper blade and/or the scraper blade holder being rotated about the pivot connection.

In at least one embodiment, the scraper blade has a top side and a bottom side; and one of the at least two scraper blade fasteners is disposed on the top side, and one of the at least two scraper blade fasteners is disposed on the bottom side.

In at least one embodiment, the scraper blade holder comprises a pedestal; and the pedestal supports the pivot connection.

In at least one embodiment, the scraper blade holder comprises at least one scraper blade mounting wall which extends transverse to the pedestal; and the at least one scraper blade holder fastener is disposed with the at least one scraper blade mounting wall.

In at least one embodiment, the at least one scraper blade mounting wall comprises at least two scraper blade mounting walls; and the at least two scraper blade mounting walls extend distally transverse to the pedestal and along a pivot axis of the pivot connection.

A method of providing a scraper apparatus is provided, which, in at least one embodiment, comprises obtaining a scraper blade, wherein the scraper blade has at least one scraper blade fastener; obtaining a scraper blade holder, wherein the scraper blade holder has at least one scraper blade holder fastener; wherein the scraper blade and the scraper blade holder are rotatable relative to one another about a pivot connection formable by the scraper blade and the scraper blade holder; and wherein the at least one scraper blade fastener is fastenable with the at least one scraper blade holder fastener via the scraper blade and/or the scraper blade holder being rotated about the pivot connection.

In at least one embodiment, the method of providing a scraper apparatus further comprises forming the pivot connection with the scraper blade and the scraper blade holder; rotating the at least one of the scraper blade and/or the scraper blade holder about the pivot connection; and fastening the at least one scraper blade fastener and the at least one scraper blade holder fastener to one another while rotating the at least one of the scraper blade and/or the scraper blade holder about the pivot connection.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein:

FIG. 3A is a perspective view of a scraper blade of the scraper apparatus of FIG. 1;

FIG. 3B is a leading end view of the scraper blade of FIG. 3A;

FIG. 3C is a trailing end view of the scraper blade of FIG. 3A;

FIG. 3D is a right side view of the scraper blade of FIG. 3A;

FIG. 3E is a left side view of the scraper blade of FIG. 3A;

FIG. 3F is a close-up perspective view of a fastener within circle 3F of the scraper blade of FIG. 3A;

FIG. 3G is a close-up partial side view of the leading end region of an alternative embodiment of the scraper blade;

DETAILED DESCRIPTION

Figure 1:
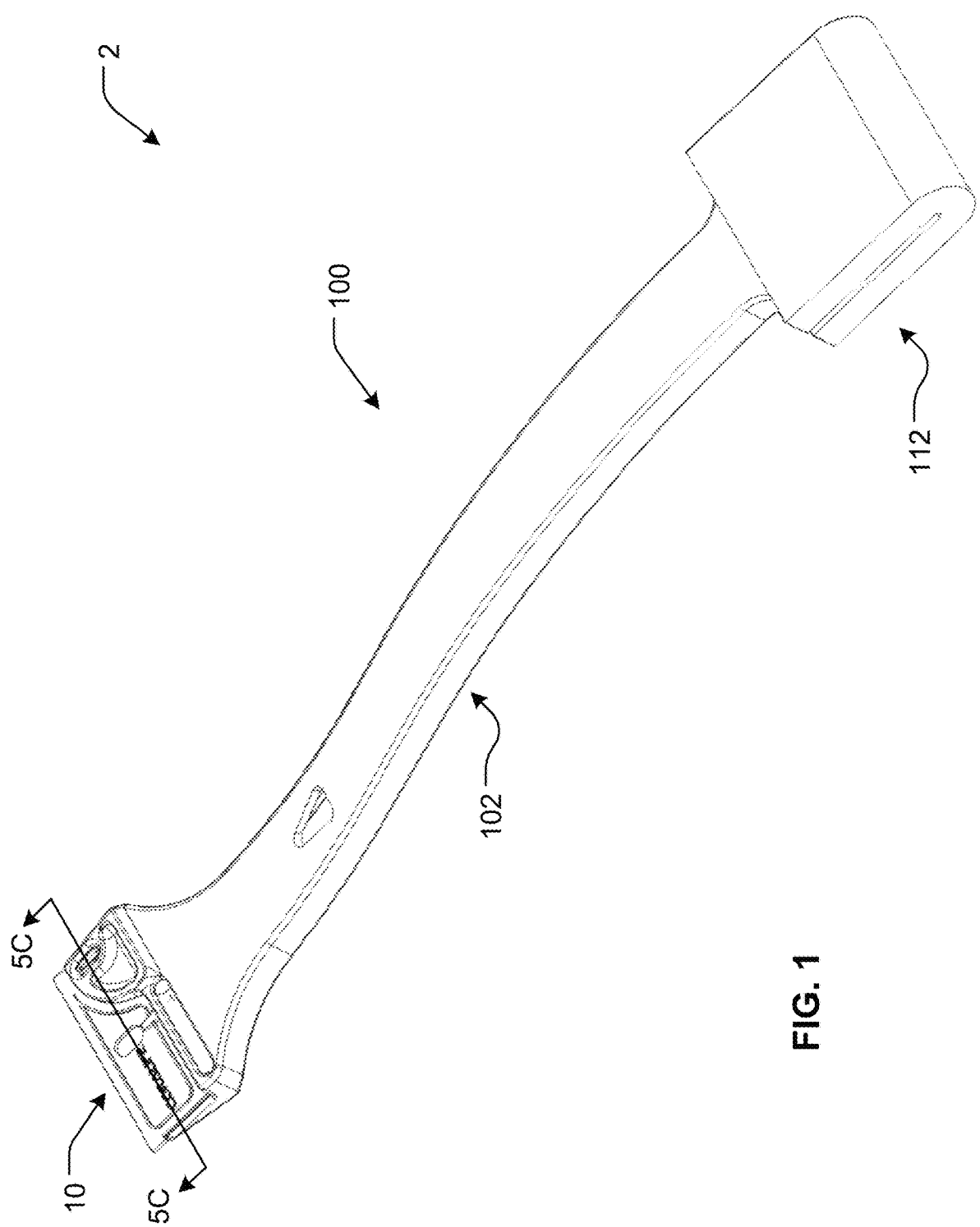
FIG. 1 is an assembled perspective view of a first embodiment of a scraper apparatus according to the present disclosure.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for purpose of description and should not be regarded as limiting as such may be understood by one of skill in the art.

Figure 2:
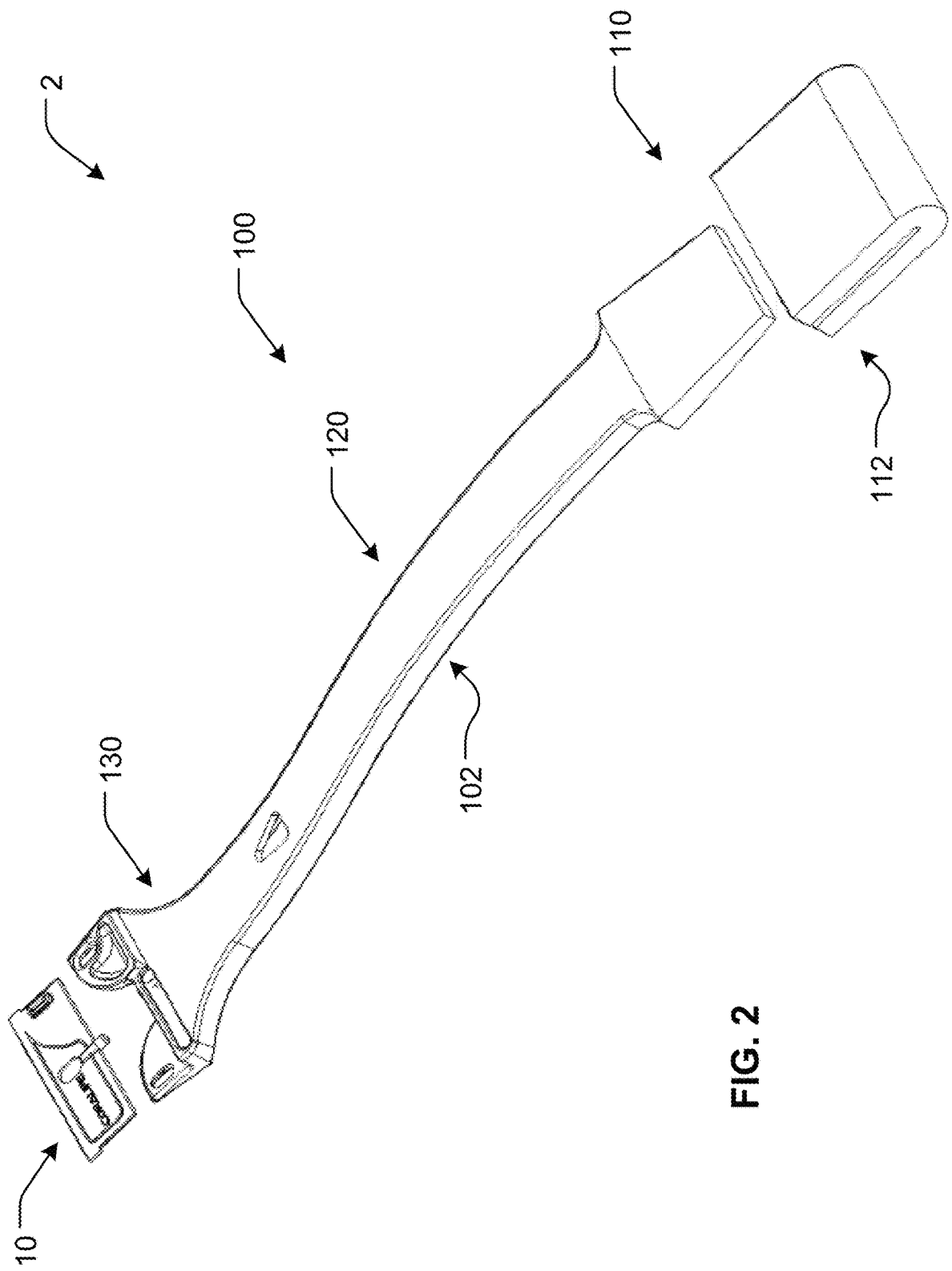
FIG. 2 is an exploded perspective view of the scraper apparatus of FIG. 1.

Referring to FIGS. 1-2, there is shown a hand holdable and manipulatable scraper apparatus 2 according to the present disclosure. As shown, scraper apparatus 2 comprises a removable/replaceable scraper blade 10 and a scraper blade manipulator 100. Scraper blade manipulator 100 has a proximal region 110, an intermediate region 120 and a distal region 130. Scraper blade manipulator 100 comprises an elongated manipulator body 102, which forms the proximal region 110, the intermediate region 120 and the distal region 130. It should be understood that the terms "proximal" and "distal" are being used relative to a user of scraper apparatus 2.

Scraper blade manipulator 100 also comprises a cleaning pad 112 disposed at the proximal region 110 of the scraper blade manipulator 100/manipulator body 102, which overlies the manipulator body 102 and which may be removable and replaceable after extended use. The cleaning pad 112 may be formed of a polymer foam (e.g. melamine foam) or textile (e.g. polyester fiber). The intermediate region 120 of the scraper blade manipulator 100/manipulator body 102 may be used as a handle by the user of the scraper apparatus 2.

As shown by FIG. 2, each of the scraper blade 10 and the manipulator body 102 may be provided by a single piece of plastic. The plastic of the scraper blade 10 may be a polymer composition, particularly a thermoplastic polymer composition, which comprise one or more polymers, such as polyolefin (e.g. high density polyethylene, polypropylene), acrylonitrile-butadiene-styrene, polymethyl methacrylate and polycarbonate. Similarly, the plastic of the manipulator body 102 may be a polymer composition, particularly a thermoplastic polymer composition, which comprise one or more polymers, such as polyolefin (e.g. high density polyethylene, polypropylene), acrylonitrile-butadiene-styrene, polymethyl methacrylate and polycarbonate. The scraper blade 10 and the manipulator body 102 may be formed, for example, by injection molding. Alternatively, the scraper blade 10 could be formed of metal, such as stainless steel.

Referring to FIGS. 3A-3F, scraper blade 10 comprises a rectangular, blade body 14, having a leading end 20 with a scraping edge 22, and a trailing end 30 opposite the leading end 20. Scraper blade 10/blade body 14 further comprises two lateral ends 36, 38, which may be referred to as a left lateral end 36 and a right lateral end 38. Scraper blade 10 further comprises a top side 40 which comprises top face 44 of blade body 14, and an opposite bottom side 42 which comprises bottom face 46 of blade body 14.

As shown, the length dimension(s) of the blade body 14 of the scraper blade 10 extend in length direction L. Additionally, the width dimension(s) of the blade body 14 of the scraper blade 10 extend in the width direction W. Furthermore, the thickness dimension(s) of the blade body 14 of the scraper blade 10 extend in the thickness direction T.

As shown, the length direction L and the width direction W are transverse to one another, and more particularly substantially orthogonal/perpendicular (in other words, for example, within manufacturing tolerances). Also as shown, the thickness direction T is transverse to the length direction L and the width direction W, and more particularly substantially orthogonal/perpendicular (in other words, for example, within manufacturing tolerances) thereto.

The blade body 14 may have a length in a range of 25 mm to 127 mm, and more particularly in a range of 38 mm to 114 mm. Even more particularly, the length may be in a range of 50 mm to 102 mm. The blade body 14 may have a width in a range of 19 mm to 38 mm, and more particularly in a range of 25 mm to 31 mm. The blade body 14 may have a thickness in a range of 1.0 mm to 5 mm, and more particularly in a range of 1.5 mm to 3.5 mm.

The scraper blade 10 further comprises a cylindrical pivot pin 50. Cylindrical pivot pin 50 extends proximally from trailing end 30 of the blade body 14 of the scraper blade 10. The pivot pin 50 extends proximally from trailing end 30 of the blade body 14 at a middle of the blade body 14, particularly with a longitudinal center of the pivot pin 50 extending along a pivot pin (or pivot) axis 54 which is transverse to the length direction L and thickness direction T of the blade body 14, and more particularly substantially orthogonal/perpendicular (in other words, for example, within manufacturing tolerances) thereto. From the foregoing, the pivot pin (or pivot) axis 54 may also be understood as being substantially parallel (in other words, for example, within manufacturing tolerances) to the width direction W of the blade body 14.

The pivot pin (or pivot) axis 54 is disposed at a geometric center of the length and thickness of the blade body 14. As such, the pivot pin (or pivot) axis 54 may be understood to bifurcate the length of the blade body 14 into two halves of substantially equal length (in other words, for example, within manufacturing tolerances).

Pivot pin 50 may have an outer diameter in a range of 2 mm to 3.5 mm, and more particularly 2.5 mm to 3 mm. Pivot pin 50 may have a length of 2 mm to 4 mm from the trailing end 30 of the blade body 14.

The scraper blade 10 further comprises a male fastener 58 in a form of a projection 60 which projects from the front face 44 of the blade body 14. As shown in FIG. 3A, the male fastener 58 is disposed adjacent the right lateral end 38 of the blade body 14, in a medial region between the leading end 20 and the trailing end 30.

As shown best by FIG. 3F, the male fastener 58 comprises an elongated oval shaped (split) annular ring 62. As shown, the split annular ring 62 is formed by two opposing elongated projecting side wall sections 68, 70 which are separated at each end by gaps 74, 76. As shown, gaps 74, 76 are disposed opposite one another, particularly at the proximal end region 94 and distal end region 96 of the elongated ring 62. The projecting wall sections 68, 70 are also shown to be mirror images of one another. Also as shown, the annular ring 62 narrows as it extends distally, thus being wider at the arcuate proximal end region 94 than the arcuate distal end region 96.

The wall sections 68, 70 project transverse to the blade body 14, and more particularly substantially orthogonal/perpendicular (in other words, for example, within manufacturing tolerances) thereto. Each of the wall sections 68, 70 has an inner face 80 and an outer face 82. The inner faces 80 of the wall sections 68,70 face toward one another, while the outer faces 82 of the wall sections 68, 70 face away from one another.

The outer face 82 of each wall section 68, 70 includes an elongated, semi-circular, recess 86, which is formed as a groove and positioned as an undercut, as well as an elongated shoulder 88 disposed between each recess 86 and a terminal end 98 of the wall sections 68, 70. The elongated recess 86 and the elongated shoulder 88 each have an elongated length which extends longitudinally along a linear region 92 of the wall sections 68, 70, disposed between the arcuate proximal end region 94 and the arcuate distal end region 96.

Scraper blade 10 further comprises another male fastener 64, also in the form of the same projection 60, which projects from the bottom face 46 of the blade body 14, and which is disposed adjacent the left lateral end 36 of the blade body 14, in a medial region between the leading end 20 and the trailing end 30. The two male fasteners 58, 64 are identical in shape and size, and, given the scraper blade 10 has rotational symmetry of the second order (two-fold rotational symmetry of 180 degrees), the fasteners 58 and 64 are interchangeable. Stated another way, depending upon orientation of scraper blade 10, the top side 40 and bottom side 42 are rotationally identical and interchangeable.

Referring to FIG. 3G, in another embodiment the leading end 20 of the scraper blade 10 may be a beveled leading end. As shown in FIG. 3G, the leading end 20 of the scraper blade 10 is a double beveled leading end. Moreover, the leading end 20 may be disposed in a leading region 24, which extends along a full length of the blade 10/blade body 14 and includes the scraping edge 22, which is formed of an elastomeric polymer composition.

As used herein, an elastomeric polymer composition may include any composition with a glass transition temperature (Tg) below room temperature and which is at most, 50% crystalline (in other words, the material contains an amorphous phase of 50% or greater, up to 100% amorphous phase). The elastomeric polymer composition may also be characterized as a material that has an elongation at 23° C. of at least 100%, and which, after being stretched to twice its original length and being held at such for one minute, may recover in a range of 50% to 100% within one minute after release from the stress. More particularly, the elastomeric polymer composition may recover in a range of 75% to 100% within one minute after release from the stress, and even more particularly recover in a range of 90% to 100% within one minute after release from the stress.

Exemplary elastomeric polymer compositions may particularly include elastomers, particularly styrene block polymers, such as styrene block copolymers (e.g. styrene-butadiene copolymer) and styrene block terpolymers (e.g. styrene-butadiene-styrene terpolymer, styrene-ethylenel-butylene-styrene terpolymer, styrene-ethylene/propylene-styrene terpolymer); polyolefin blends (e.g. polypropylene and ethylene-propylene-diene monomer rubber, polypropylene and nitrile rubber, ethylene-propylene rubber); elastomeric alloys such as melt-processable rubbers and thermoplastic vulcanizates; polyolefins; polyurethanes; polyesters; and rubbers such as natural rubber, neoprene rubber, acrylic rubber, butadiene rubber, butyl rubber, ethylene-propylene rubber, ethylene propylene diene monomer rubber, fluorocarbon rubber, isoprene rubber, nitrile rubber, polyurethane rubber and silicone rubber.

The remainder of the blade 10/blade body 14 may be referred to as a trailing region 34, which includes the trailing end 30, pivot pin 50 and male fasteners 58, 64. The trailing region 34 may be formed of a polymer composition, particularly a thermoplastic polymer composition, which has a flexural modulus, as measured, for example, ASTM D-790-17, which is greater than the flexural modulus of the elastomeric polymer composition used for the leading region 24/scraping edge 22. For example, the flexural modulus of the (thermoplastic) polymer composition of the trailing region 34 may be at least 50,000 psi., 75,000 psi. or 100,000 psi. greater than the flexural modulus of the elastomeric polymer composition used for the leading region 24/scraping edge 22.

Moreover, the trailing region 34 may be formed of a polymer composition, particularly a thermoplastic polymer composition, which has a Shore A durometer hardness, as measured, for example, ASTM D-2240-15, which is greater than the hardness of the elastomeric polymer composition used for the leading region 24/scraping edge 22. For example, the hardness of the (thermoplastic) polymer composition of the trailing region 34 may be at least 10 Shore A, 20 Shore A or 30 Shore A greater than the flexural modulus of the elastomeric polymer composition used for the leading region 24/scraping edge 22. The two material compositions may be injection molded together two-shot injection molding with one region molded before the other region and the regions bonded (welded) with a butt joint as shown.

In the foregoing manner, the leading region 24/scraping edge 22 may be less apt to scratch the wall of the tank due to the lower flexural modulus/hardness, while the trailing region 34 may offer greater support for leading region 24/scraping edge 22 due to the greater flexural modulus/hardness.

Figure 4A:
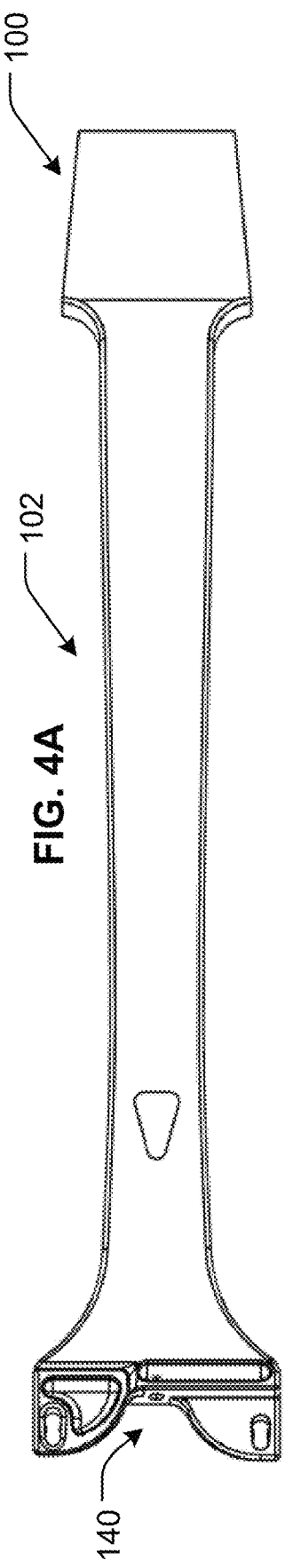
FIG. 4A is a top view of a manipulator body of a scraper blade manipulator of the scraper apparatus of FIG. 1.
Figure 4B:
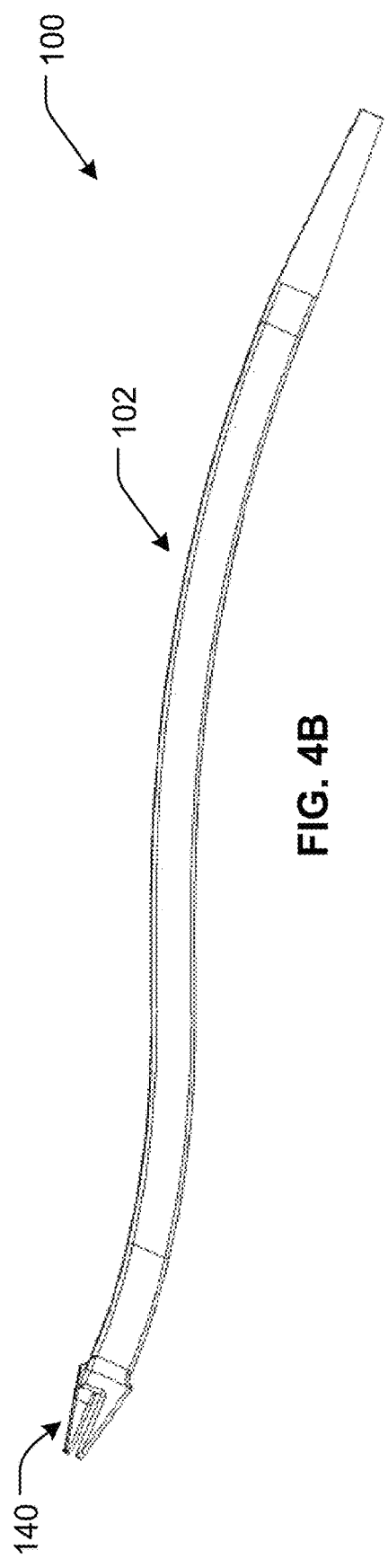
FIG. 4B is a side view of the manipulator body of FIG. 4A.
Figure 4C:
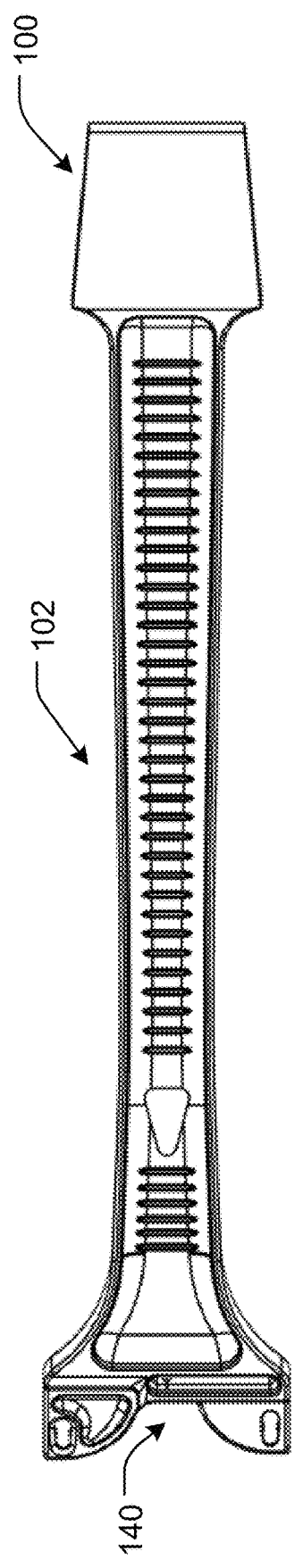
FIG. 4C is a bottom view of the manipulator body of FIG. 4A.
Figure 4D:
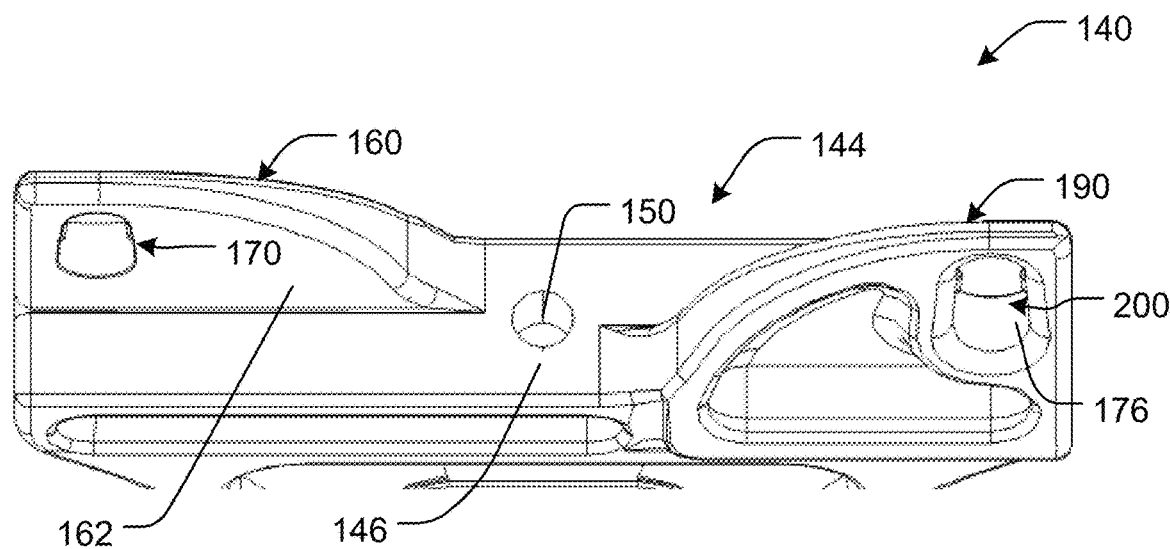
FIG. 4D is a distal end view of the manipulator body of FIG. 4A.
Figure 4E:
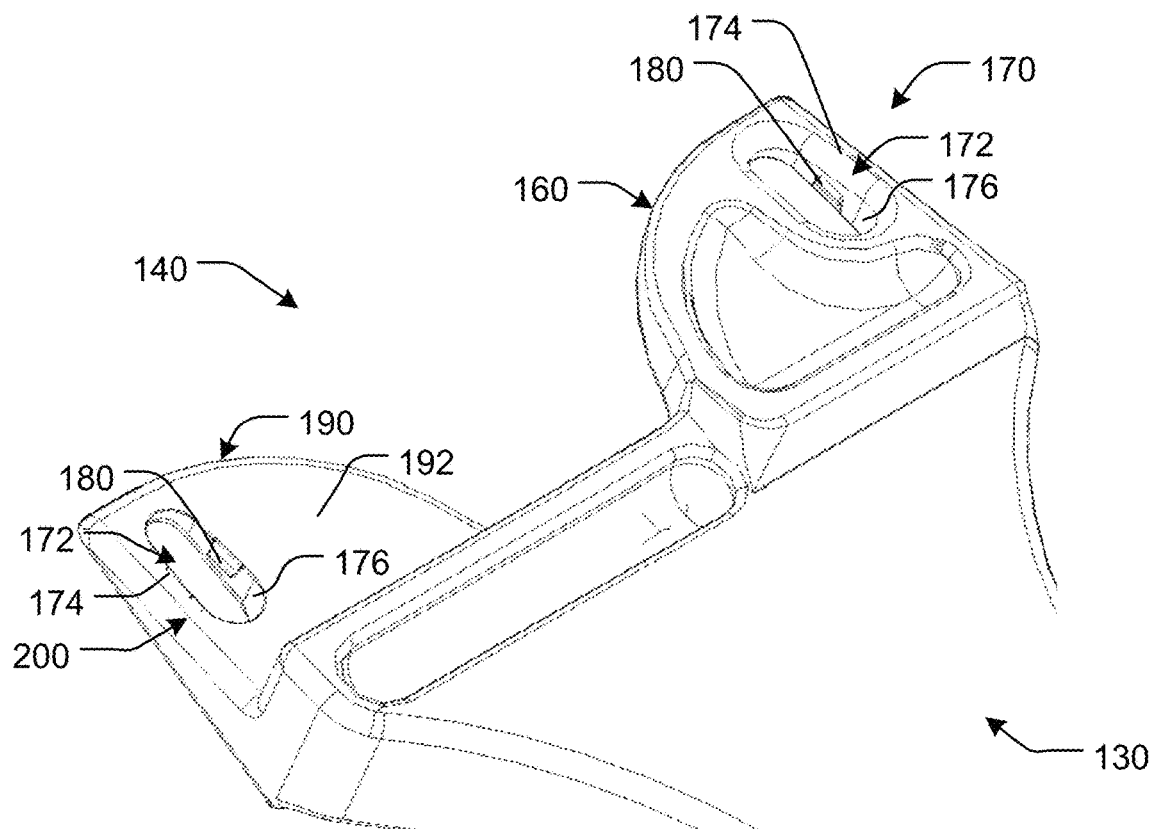
FIG. 4E is a close-up perspective view of the distal end of the manipulator body of FIG. 4A.

Referring to FIGS. 4A-4E, the distal end region 130 of the scraper blade manipulator 100, and more particularly the manipulator body 102, comprises a scraper blade holder 140. As best shown by FIGS. 4D-4E, scraper blade holder 140 comprises a pedestal 144 having a pedestal face 146. Pedestal 144 includes a pivot pin receptacle 150 formed in the pedestal 144, including the face 146. Pivot pin receptacle 150 is configured to form a pivot connection 152 (see FIG. 5B) when the pivot pin 50 of scraper blade 10 is received therein and the scraper blade 10 and scraper blade manipulator 100 are assembled to one another. The pedestal 144 provides support for the pivot connection 152 and, as shown, when the scraper blade 10 in installed in the scraper blade holder 140, the trailing end 30 of the scraped blade 10 is adjacent and extends longitudinally along, more particularly substantially parallel with (in other words, for example, within manufacturing tolerances) the pedestal face 146. The pedestal face 146 and the pivot pin (or pivot) axis 54 are transverse to one another, and more particularly substantially orthogonal/perpendicular (in other words, for example, within manufacturing tolerances).

Scraper blade holder 140 further comprises two scraper blade mounting extension walls 160, 190 to which the scraper blade 10 is mountable thereto. Mounting wall 160 may be more particularly referred to as an upper mounting wall 160. as such is configured to abut, brace and support scraper blade 10 at the top side 40 thereof. Conversely, mounting wall 190 may be more particularly referred to as a lower mounting wall, as such is configured to abut, brace and support scraper blade 10 at the bottom side 42 thereof.

As shown, upper mounting wall 160 has a planar lower face 162, while lower mounting wall 190 as a planar upper face 192. Upper mounting wall 160 extends distally from pedestal 144, with planar lower face 162 transverse to pedestal face 146. Similarly, lower mounting wall 190 extends distally from pedestal 144, with planar upper face 192 transverse to pedestal face 146. More particularly, the planar lower face 162 and the planar upper face 192, respectively, are substantially orthogonal/perpendicular (in other words, for example, within manufacturing tolerances) to the pedestal face 146. As such, it may be understood that planar lower face 162 of the upper mounting wall 160 and the planar upper face 192 of the lower mounting wall 190 are substantially parallel to one another (in other words, for example, within manufacturing tolerances), with the planar lower face 162 and planar upper face 192 spaced from one another at a distance which is substantially equal (in other words, for example, within manufacturing tolerances) to a thickness of the blade body 14 (as may be seen by FIG. 4B). In such regards, it should also be understood that the that planar lower face 162 of the upper mounting wall 160 and the planar upper face 192 of the lower mounting wall 190 extend distally with (along) the pivot axis 54, and more particularly substantially parallel (in other words, for example, within manufacturing tolerances) with the pivot axis 54.

As shown, upper mounting wall 160 further comprises a female fastener 170 in a form of a recess receptacle 172, and more particularly of a through-hole which extends through the upper mounting wall 160 in a direction which is transverse, and more particularly substantially orthogonal/perpendicular (in other words, for example, within manufacturing tolerances), to the pivot axis 54. As shown, recess receptacle 172 comprises an elongated oval shape, which is configured to receive and mate with the oval shaped split annular ring 62 of male fastener 58. As shown, recess receptacle 172 is defined by a continuous (in other words 360 degree) side wall 174 which surrounds the male fastener. Side wall 174 has an inner face 176 which includes two elongated, protruding, cantilevered, semi-circular engagement tabs 180, which face one another, and which are configured to occupy the elongated recesses 86 of the male fastener 60 upon assembly of the scraper blade 10 and the scraper blade manipulator 100.

Scraper blade manipulator 100 further comprises another female fastener 200, also in the form of the same recess receptacle 172 and more particularly of a through-hole, which extends through the lower mounting wall 190. Once again, inner face 176 of side wall 174 of recess receptacle 172 includes two engagement tabs 180 which face one another, and which are configured to occupy the elongated recesses 86 of the male fastener 64 upon assembly of the scraper blade 10 and the scraper blade manipulator 100.

Figure 5A:
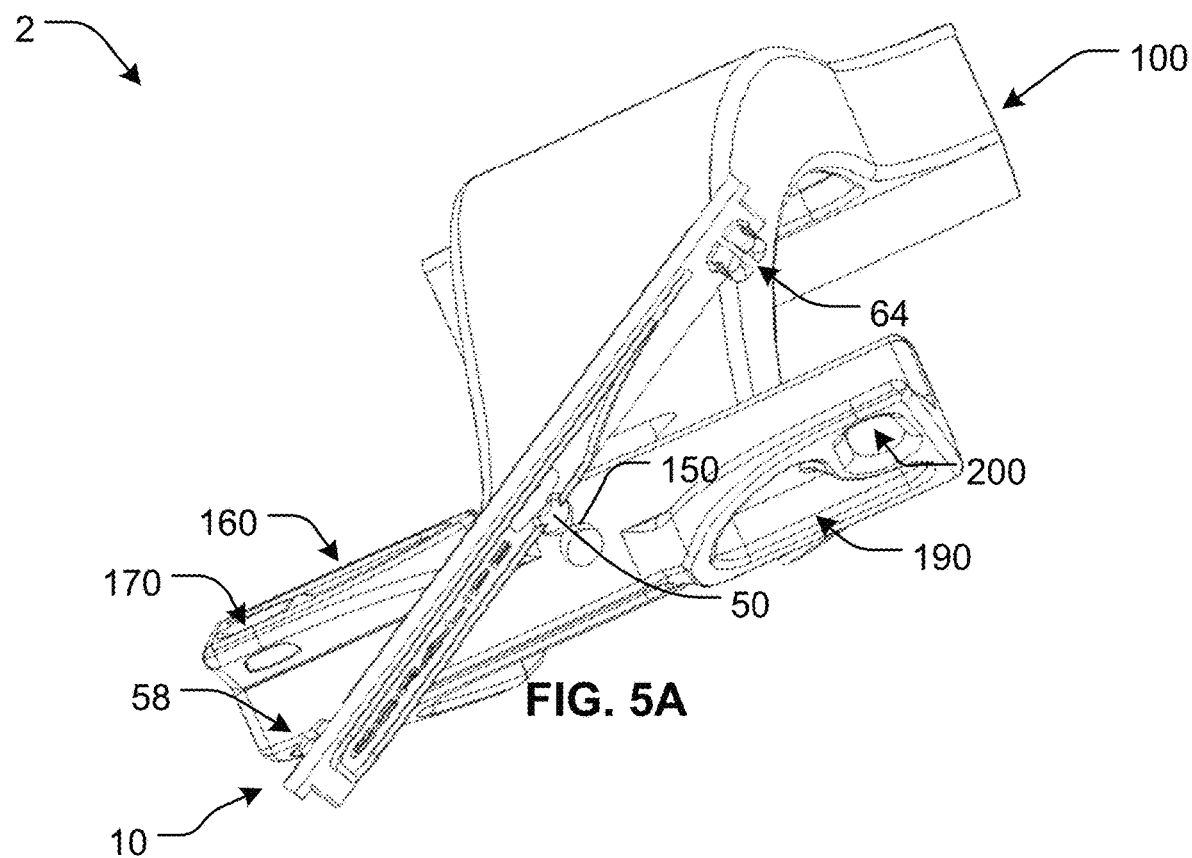
FIG. 5A is perspective view of the scraper blade of the scraper apparatus of FIG. 1 being connected to the scraper blade manipulator.

Referring to FIGS. 5A-5D, and more particularly FIG. 5A, in order to assemble the scraper blade 10 and the scraper blade manipulator 100, the scraper blade 10 and the scraper blade manipulator 100 are first orientated relative to one another such that the pivot pin 50 of the scraper blade 10 is insertable into the pivot pin receptacle 150 of the scraper blade manipulator 100 without interference from one another. As shown, the scraper blade 10 and the scraper blade manipulator 100 are orientated relative to one another such that insertion of the pivot pin 50 into the pivot pin receptacle 150 is facilitated, particularly without the scraper blade 10 making contact with either of the blade mounting walls 160, 190 of the scraper blade manipulator 100 while the pivot pin 50 is inserted into the pivot pin receptacle 150.

Figure 5B:
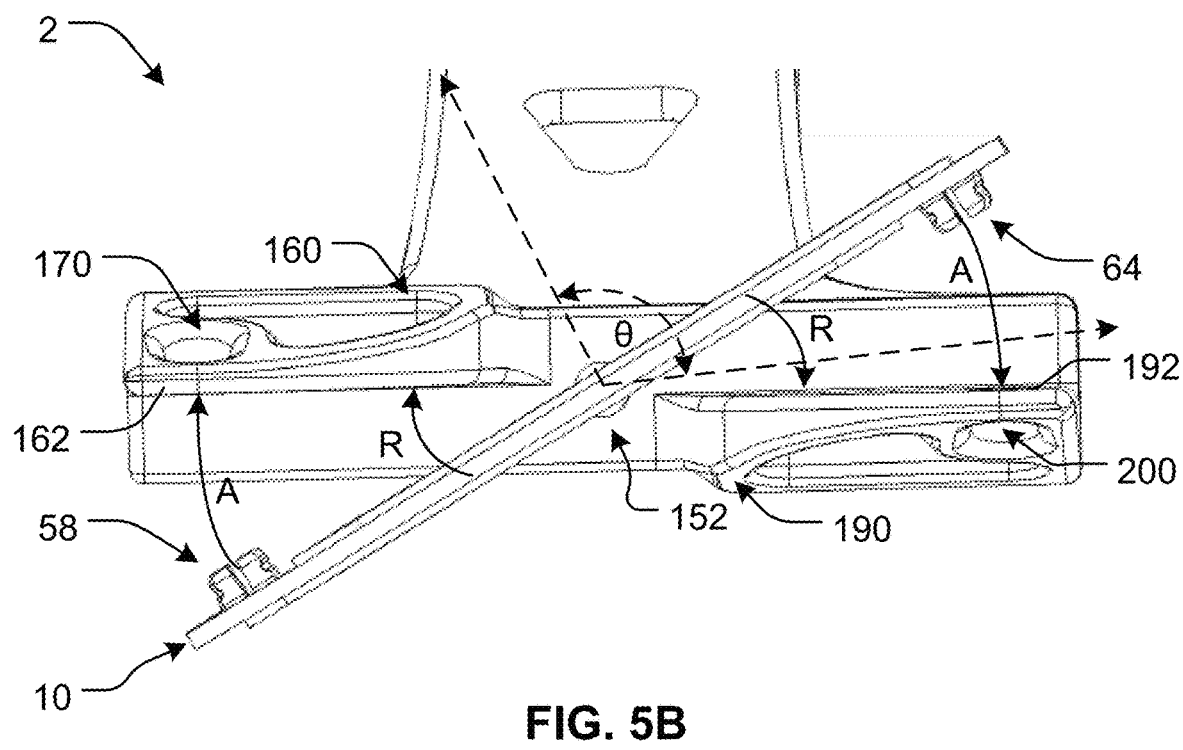
FIG. 5B is distal end view of the scraper blade of the scraper apparatus of FIG. 1 connected to the scraper blade manipulator.

As shown by FIG. 5B, when pivot pin 50 is properly aligned with the pivot pin receptacle 150 (in other words aligned on axis 54), the blade body 14 may be oriented at any angle in the angle range θ. When the blade body 14 is not within the angle range θ, insertion of the pivot pin 50 into the pivot pin receptacle 150 will be inhibited by the scraper blade 10 making premature contact with the blade mounting walls 160, 190.

Once the pivot pin 50 is properly inserted in the pivot pin receptacle 150, the scraper blade 10 and/or the scraper blade manipulator 100 is/are rotated about pivot axis 54 relative to one another. As shown by FIG. 5B, the scraper blade 10 is preferably rotated relative to the scraper blade manipulator 100 as shown by arrows R.

Figure 5C:
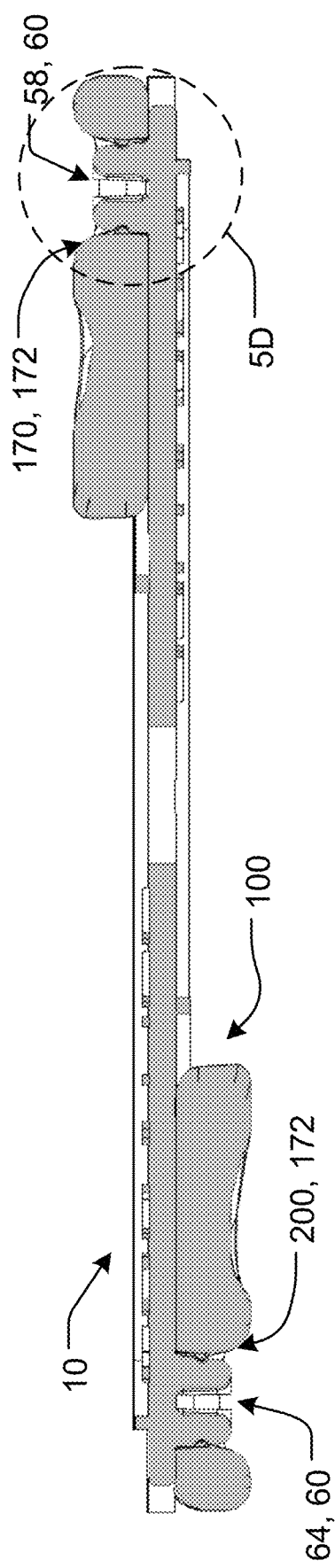
FIG. 5C is a cross-sectional view of the scraper blade and scraper blade manipulator taken along line 5C-5C of FIG. 1.
Figure 5D:
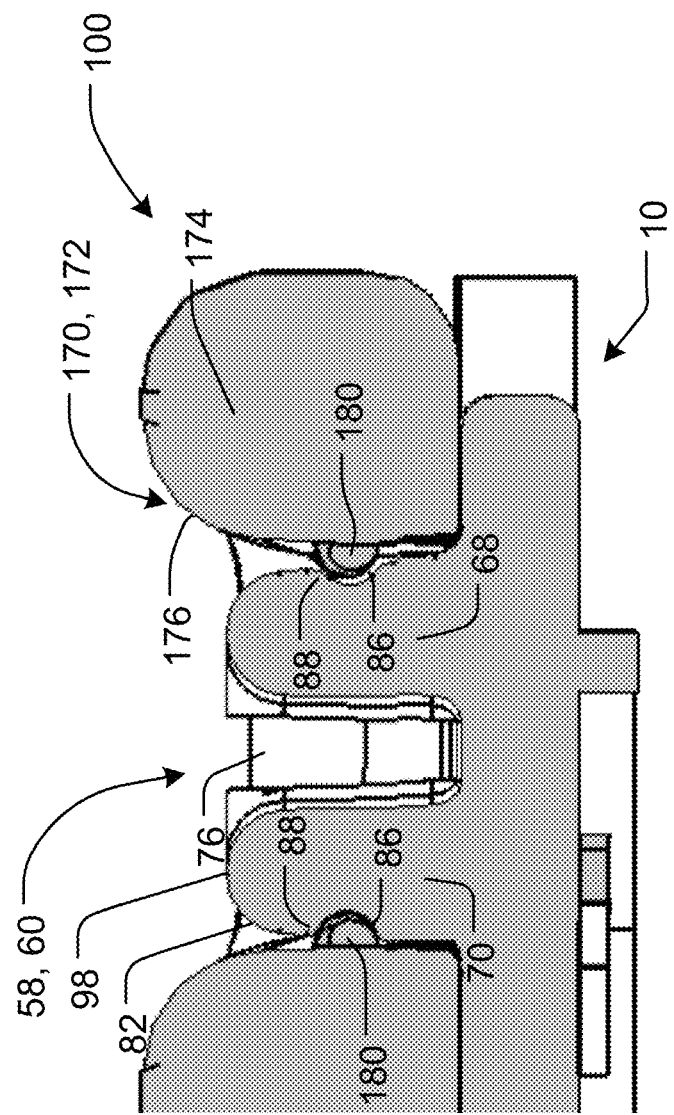
FIG. 5D is a close-up cross-sectional view within circle 5D of FIG. 5C.

Referring to FIGS. 5B-5D, when scraper blade 10 is preferably rotated relative to the scraper blade manipulator 100 as shown by arrows R, the male fasteners 58, 64 move along arc A to mechanically engage with the female fasteners 170, 200 respectively. More particularly, the projections 60 of male fasteners 58, 64 mechanically engage within recess receptacles 172 of female fasteners 170, 200.

Even more particularly, as the scraper blade 10 is rotated, the portions of the wall sections 68, 70 of the male fasteners 58, 64 formed by shoulders 88 make contact with the engagement tabs 180 of the female fasteners 170, 200. Upon further rotation, each of the wall sections 68, 70 may elastically deform inwards, such that the gaps 74, 76 of the split rings 62 may momentarily narrow due to the interference. Thereafter, with further rotation of the scraper blade 10, the tabs 180 of the female fasteners may enter into the recesses 86 of the wall sections 68, 70 of the male fasteners 58, 64, at which point the wall sections 68, 70 of the male fasteners 58, 64 may return at least in part to their pre-deformation position.

As such, in light of the foregoing, a positive mechanical engagement is now formed between the male fasteners 58, 64 and the female fasteners 170, 200, respectively, which inhibits separation of the scraper blade 10 and the scraper blade manipulator 100. More particularly, the positive mechanical engagement is formed by the tabs 180 of the female fasteners 170, 200 inhibiting the shoulders 88 of the male fasteners 58, 64 from moving past them to exit the female fasteners 170, 200 absent a repeated inward deformation of the wall sections 68, 70 of the male fasteners 58, 64. A positive mechanical engagement connection may be understood herein as a connection formed between the components which may include friction, but does not rely solely on friction, to inhibit separation of the components and which includes a mechanical interlock to inhibit separation of the components (e.g. overlapping surfaces).

Figure 6A:
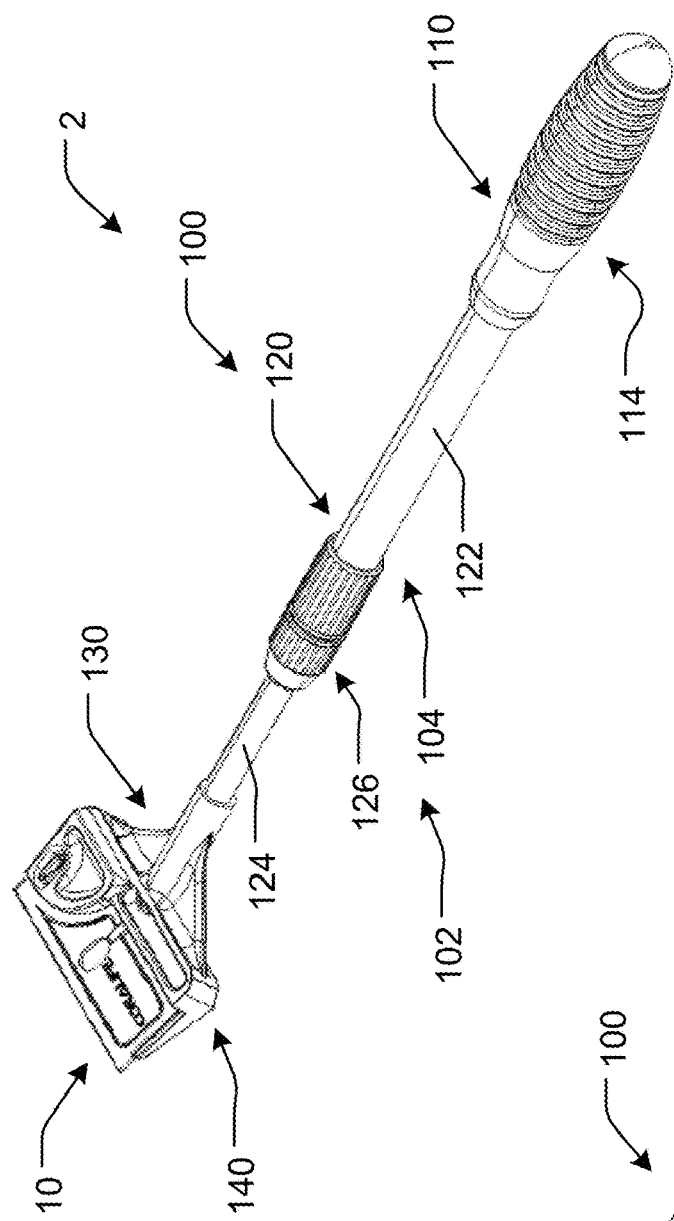
FIG. 6A is an assembled perspective view of another embodiment of a scraper apparatus according to the present disclosure.
Figure 6B:
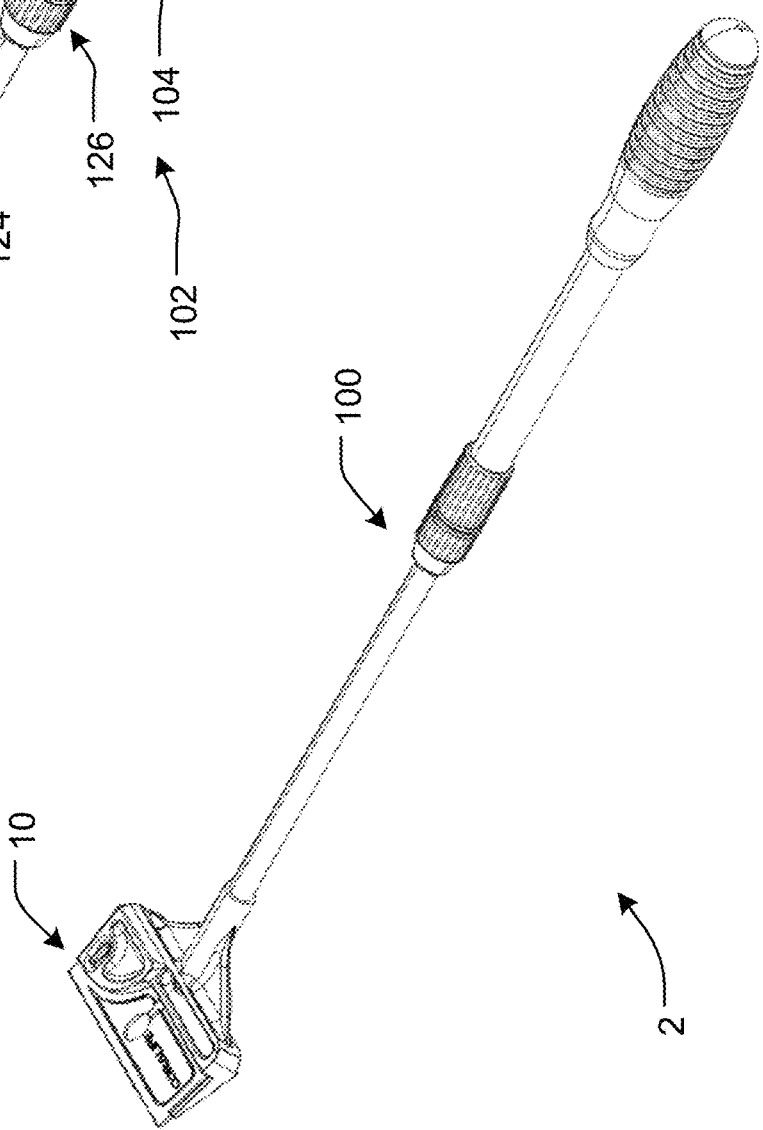
FIG. 6B is another assembled perspective view of the scraper apparatus pf FIG. 6A.

From the foregoing, a releasable positive mechanical engagement connection may be formed between the male fasteners 58, 64 and the female fasteners 170, 200, respectively, Referring to FIGS. 6A-6B, there is shown another embodiment of the scraper apparatus 2 according to the present disclosure. The scraper blade manipulator 100 comprises a scraper blade holder 140 which holds the scraper blade 10 in the same manner as the prior embodiment. The clearing pad 112 previously disposed at the proximal end region 110 of the scraper blade manipulator 100/manipulator body 102 has been eliminated and replaced with a handle 114. The one-piece scraper manipulator body 100 has also been replaced with an adjustable length, telescoping shaft 104. As shown, shaft 104 comprises a proximal section 122 and a distal section 124 which slides within proximal section 122. The length may be adjusted by loosening and tightening a locking ring 126 in a known manner. Handle 114 is attached to a proximal end of the proximal section 122, and the scraper blade holder 140, as a separate injection molded piece, is attached to a distal end of the distal section 124.

In a variant of the embodiments, it should be understood that the relative arrangements of the pivot pin 50 and the pivot pin receptacle 150 may be reversed (in other words the pivot pin 50 may be disposed on the scraper blade holder 140 and the pivot pin receptacle 150 may be disposed on the scraper blade 10. Similarly, in another variant of the embodiments, at least one of the male fasteners 58, 64 may be disposed on the scraper blade holder 140 and at least one of the female fasteners 170, 200 may be disposed on the scraper blade 10.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood the appended claims do not necessarily comprise the broadest scope of the invention(s) which the applicant is entitled to claim, or the only manner(s) in which the invention(s) may be claimed, or that all recited features are necessary.

LIST IF REFERENCE CHARACTERS 2 scraper apparatus
10 scraper blade
14 planar blade body
20 leading end
22 scraping edge
24 leading region
30 trailing end
34 trailing region
36 lateral end (left)
38 lateral end (right)
40 top side of scraper blade
42 bottom side of scraper blade
44 top face of blade body
46 bottom face of blade body
50 pivot pin
54 pivot axis
58 male fastener
60 projection
62 split ring
64 male fastener
68 wall section
70 wall section
74 gap
76 gap
80 inner face
82 outer face
86 elongated recess
88 elongated shoulder
92 linear region
94 proximal end region
96 distal end region
98 terminal end
100 scraper blade manipulator
102 manipulator body
104 shaft
110 proximal region
112 cleaning pad
114 handle
120 intermediate region
122 shaft proximal section
124 shaft distal section
126 locking ring
130 distal region
140 scraper blade holder
144 pedestal
146 pedestal face
150 pivot pin receptacle
152 pivot connection
160 upper mounting wall
162 planar lower face
170 female fastener
172 recess receptacle
174 side wall
176 inner face
180 engagement tabs
190 lower mounting wall
192 planar upper face
200 female fastener
L length direction
W width direction
T thickness direction
θ angle
R rotation arrows
A arc

What is claimed is:

1. A scraper apparatus, comprising:
a scraper blade;
a scraper blade holder;

wherein the scraper blade and the scraper blade holder are rotatable relative to one another about a pivot connection formable by the scraper blade and the scraper blade holder;

wherein the scraper blade has at least one scraper blade fastener;

wherein the scraper blade holder has at least one scraper blade holder fastener; wherein the at least one scraper blade fastener being located on an outer planar end surface of the scraper blade and operatively connectable to the at least one scraper blade holder fastener; and wherein the at least one scraper blade fastener is fastenable with the at least one scraper blade holder fastener into a releasable positive mechanical engagement via the scraper blade and/or the scraper blade holder being rotated relative to one another about the pivot connection to provide the releasable positive mechanical engagement, wherein the releasable positive mechanical engagement locks rotation of the scraper blade relative to the scraper blade holder.

2. The scraper apparatus of claim 1, wherein:
the scraper blade comprises a leading end and a trailing end; and
the pivot connection extends along a pivot axis which is transverse to the leading end and/or the trailing end.

3. The scraper apparatus of claim 1, wherein:
the scraper blade or the scraper blade holder comprises a pivot pin;
the scraper blade or the scraper blade holder comprises a pivot pin receptacle; and
the pivot pin connection is formable by the pivot pin and the pivot pin receptacle.

4. The scraper apparatus of claim 3, wherein:
the scraper blade comprises the pivot pin; and
the scraper blade holder comprises the pivot pin receptacle.

5. The scraper apparatus of claim 1, wherein:
the at least one scraper blade fastener comprises at least one scraper blade male fastener and/or a at least one scraper blade female fastener;
the at least one scraper blade holder fastener comprises at least one scraper blade holder male fastener and/or at least one scraper blade holder female fastener; and
the at least one scraper blade male fastener is fastenable with the at least one scraper blade holder female fastener and/or the at least one scraper blade holder male fastener is fastenable with the at least one scraper blade female fastener.

6. The scraper apparatus of claim 5, wherein:
the at least one scraper blade fastener comprises the at least one scraper blade male fastener;
the at least one scraper blade holder fastener comprises the at least one scraper blade holder female fastener; and
the at least one scraper blade male fastener is fastenable with the at least one scraper blade holder female fastener via the scraper blade and/or the scraper blade holder being rotated about the pivot connection.

7. The scraper apparatus of claim 6, wherein:
the at least one scraper blade male fastener comprises at least one projection shaped as an annular ring; and
the at least one scraper blade holder female fastener surrounds the at least one projection and comprises at least one projection receptacle which receives the projection.

8. The scraper apparatus of claim 7, wherein:
the annular ring is a split annular ring.

9. The scraper apparatus of claim 7, wherein:
the at least one projection receptacle comprises at least engagement tab;
the projection comprises at least one engagement tab recess; and
the at least one engagement tab is fastenable with the at least one engagement tab recess.

10. The scraper apparatus of claim 9, wherein:
the at least engagement tab comprises an elongated, semi-circular engagement tab; and
the at least one engagement tab recess comprises an elongated, semi-circular engagement tab recess.

11. The scraper apparatus of claim 9, wherein:
the at least one engagement tab comprises at least two engagement tabs;
the at least one engagement tab recess comprises at least two engagement tab recesses; and
each one of the at least two engagement tabs is fastenable with each one of the at least two engagement tab recesses, respectively.

12. The scraper apparatus of claim 1, wherein:
the at least one scraper blade fastener is fastenable with the at least one scraper blade holder fastener with a mechanical interlock provided by the releasable positive mechanical engagement.

13. The scraper apparatus of claim 1, wherein:
the scraper blade has rotational symmetry when rotated about the pivot connection.

14. The scraper apparatus of claim 1, wherein:
the at least one scraper blade fastener comprises at least two scraper blade fasteners;
the at least one scraper blade holder fastener comprises at least two scraper blade holder fasteners; and
each one of the at least two scraper blade fasteners is fastenable with each one of the at least two scraper blade holder fasteners, respectively, via the scraper blade and/or the scraper blade holder being rotated about the pivot connection.

15. The scraper apparatus of claim 13, wherein:
the scraper blade has a top side and a bottom side; and
one of the at least two scraper blade fasteners is disposed on the top side, and one of the at least two scraper blade fasteners is disposed on the bottom side.

16. The scraper apparatus of claim 1 wherein:
the scraper blade holder comprises a pedestal; and
the pedestal supports the pivot connection.

17. The scraper apparatus of claim 16 wherein:
the scraper blade holder comprises at least one scraper blade mounting wall which extends transverse to the pedestal; and
the at least one scraper blade holder fastener is disposed with the at least one scraper blade mounting wall.

18. The scraper apparatus of claim 17 wherein:
the at least one scraper blade mounting wall comprises at least two scraper blade mounting walls; and
the at least two scraper blade mounting walls extend distally transverse to the pedestal and along a pivot axis of the pivot connection.

19. A method of providing a scraper apparatus, comprising:
obtaining a scraper blade, wherein the scraper blade has at least one scraper blade fastener;
obtaining a scraper blade holder, wherein the scraper blade holder has at least one scraper blade holder fastener;

wherein the scraper blade and the scraper blade holder are rotatable relative to one another about a pivot connection formable by the scraper blade and the scraper blade holder; wherein the at least one scraper blade fastener being located on an outer planar end surface of the scraper blade and operatively connectable to the at least one scraper blade holder fastener; and wherein the at least one scraper blade fastener is fastenable with the at least one scraper blade holder fastener into a releasable positive mechanical engagement via the scraper blade and/or the scraper blade holder being rotated relative to one another about the pivot connection to provide the releasable positive mechanical engagement, wherein the releasable positive mechanical engagement locks rotation of the scraper blade relative to the scraper blade holder.

20. The method of providing a scraper apparatus of claim 19, further comprising:

forming the pivot connection with the scraper blade and the scraper blade holder;

rotating the at least one of the scraper blade and/or the scraper blade holder about the pivot connection; and fastening the at least one scraper blade fastener and the at least one scraper blade holder fastener to one another while rotating the at least one of the scraper blade and/or the scraper blade holder about the pivot connection.

* * * * *